United States Patent
Miyanaga

(10) Patent No.: US 9,291,865 B2
(45) Date of Patent: Mar. 22, 2016

(54) LIQUID CRYSTAL DISPLAY DEVICE

(75) Inventor: Naoki Miyanaga, Kaga (JP)

(73) Assignee: Japan Display Inc., Tokyo (JP)

(*) Notice: Subject to any disclaimer, the term of this patent is extended or adjusted under 35 U.S.C. 154(b) by 958 days.

(21) Appl. No.: 13/476,407

(22) Filed: May 21, 2012

(65) Prior Publication Data

US 2013/0050626 A1 Feb. 28, 2013

(30) Foreign Application Priority Data

Aug. 23, 2011 (JP) .................... 2011-181589

(51) Int. Cl.
*G02F 1/1345* (2006.01)
*G02F 1/1343* (2006.01)

(52) U.S. Cl.
CPC ........ *G02F 1/1345* (2013.01); *G02F 1/134363* (2013.01); *G02F 2001/134372* (2013.01); *G02F 2001/134381* (2013.01); *G02F 2201/121* (2013.01); *G02F 2202/22* (2013.01)

(58) Field of Classification Search
CPC ................ G02F 2001/134381; G02F 2202/22; G02F 1/136204; G02F 1/1345; G02F 1/134363; G02F 2201/121; G02F 2001/134372
See application file for complete search history.

(56) References Cited

U.S. PATENT DOCUMENTS

| | | | |
|---|---|---|---|
| 6,266,116 B1 | 7/2001 | Ohta et al. | |
| 7,297,979 B2 | 11/2007 | Lim et al. | |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2009/0109202 A1* | 4/2009 | Kitagawa | 345/206 |
| 2009/0207363 A1* | 8/2009 | Hirosawa | 349/139 |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |

(Continued)

OTHER PUBLICATIONS

Hama, Yoshitaka, Electrooptical Device and Electronic Equipment, Machine translation of JP 2008-040290 A from JPO AIPN website, All pages.*

(Continued)

*Primary Examiner* — Dennis Y Kim
(74) *Attorney, Agent, or Firm* — Oblon, McClelland, Maier & Neustadt, L.L.P.

(57) ABSTRACT

According to one embodiment, a liquid crystal display device includes a first substrate including a first area, a second area located around the first area, and a third area neighboring the second area, the first area including a pixel electrode including a strip-shaped main pixel electrode, the second area including a power supply pad, and the third area including a charge elimination pad, a first pad electrically connected to the charge elimination pad, a second pad neighboring the first pad at a first pad distance and electrically connected to the power supply pad, and a third pad neighboring the second pad at a second pad distance greater than the first pad distance.

17 Claims, 5 Drawing Sheets

(56) References Cited

FOREIGN PATENT DOCUMENTS

| | | |
|---|---|---|
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-92185 | 4/2005 |
| JP | 2005-181706 | 7/2005 |
| JP | 2005-182047 | 7/2005 |
| JP | 2005-242307 | 9/2005 |
| JP | 2007-140353 | 6/2007 |
| JP | 2008-40290 | 2/2008 |
| JP | 2008-46278 | 2/2008 |
| JP | 2008-165179 | 7/2008 |
| JP | 2009-109657 | 5/2009 |
| JP | 2009-192822 | 8/2009 |

OTHER PUBLICATIONS

Ougiichi et al., Display Apparatus, Machine translation of JP 2007-140353 A from JPO AIPN website, All pages.*

Office Action issued May 14, 2013 in Japanese Patent Application No. 2011-181589 (with English translation).

* cited by examiner

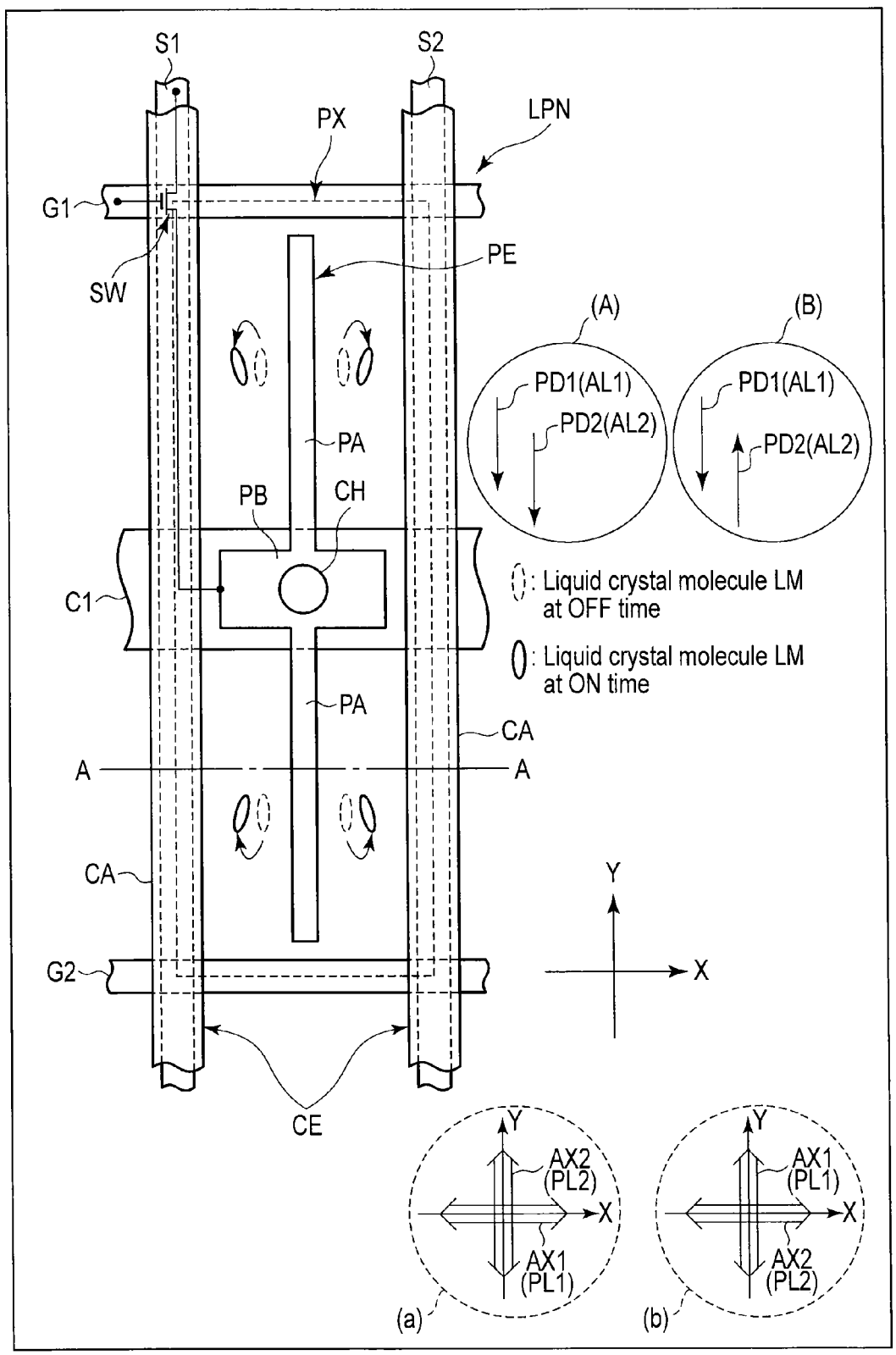
F I G. 3

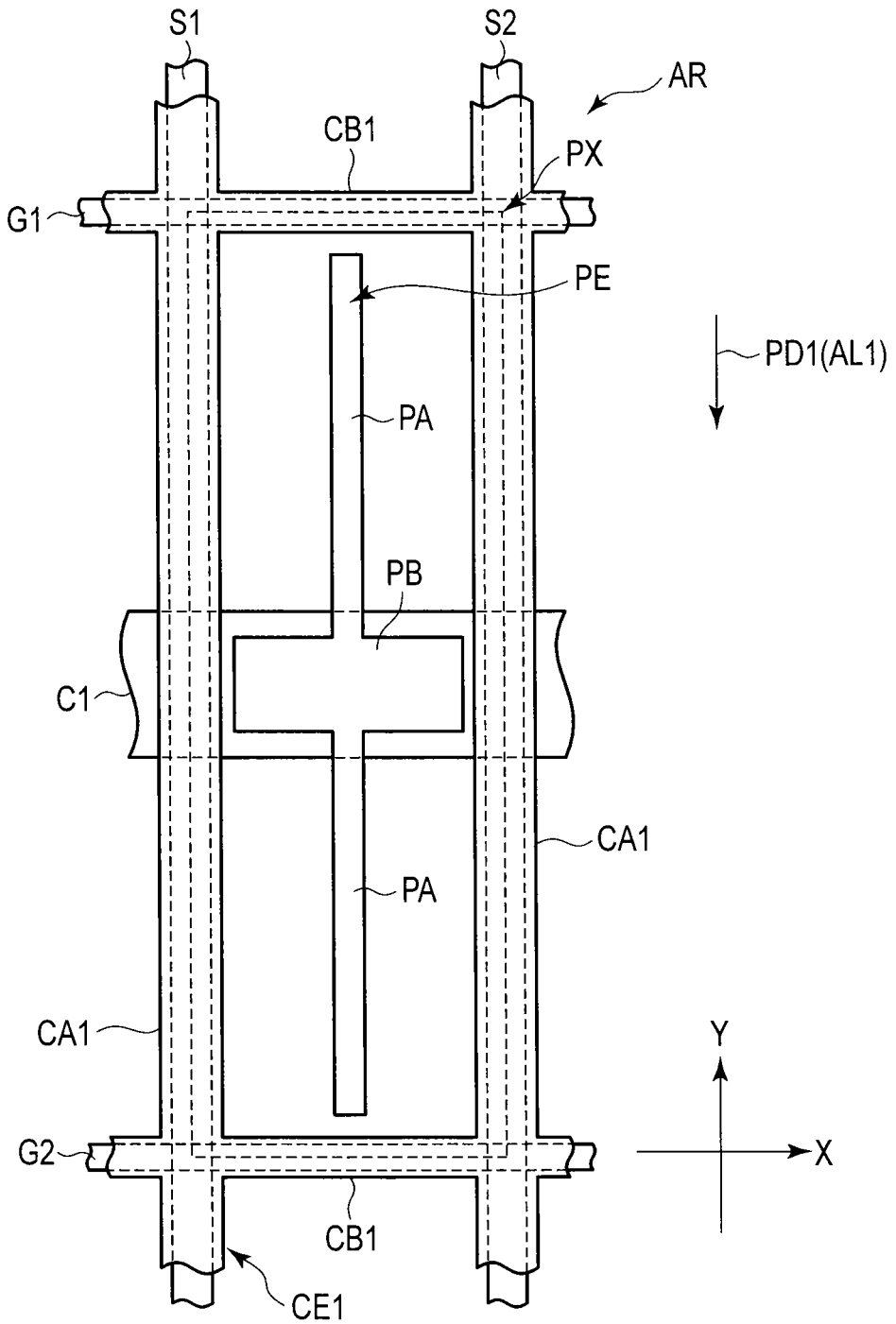
F I G. 5

LIQUID CRYSTAL DISPLAY DEVICE

CROSS-REFERENCE TO RELATED APPLICATIONS

This application is based upon and claims the benefit of priority from prior Japanese Patent Application No. 2011-181589, filed Aug. 23, 2011, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 3 is a plan view which schematically shows a structure example of a pixel at a time when a liquid crystal display panel shown in FIG. 1 is viewed from a counter-substrate side.

FIG. 5 is a plan view which schematically shows another structure example of the pixel at a time when an array substrate shown in FIG. 1 is viewed from the counter-substrate side.

DETAILED DESCRIPTION

Figure 1:
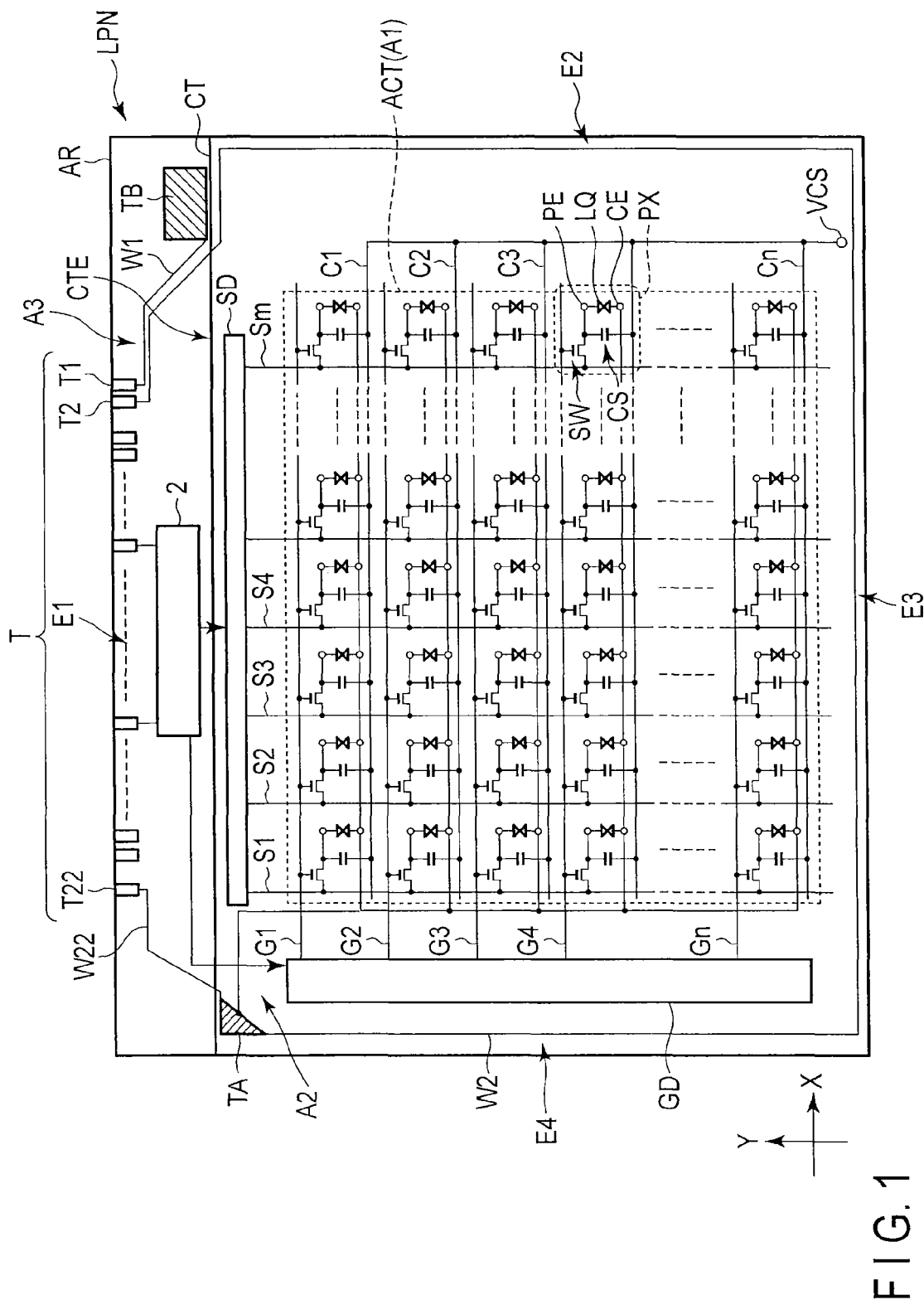
FIG. 1 is a view which schematically illustrates a structure and an equivalent circuit of a liquid crystal display device according to an embodiment.

In general, according to one embodiment, a liquid crystal display device includes: a first substrate including a first area, a second area located around the first area, and a third area neighboring the second area, the first area including a pixel electrode including a strip-shaped main pixel electrode, the second area including a power supply pad, and the third area including a charge elimination pad, a first pad electrically connected to the charge elimination pad, a second pad neighboring the first pad at a first pad distance and electrically connected to the power supply pad, and a third pad neighboring the second pad at a second pad distance greater than the first pad distance; a second substrate which is opposed to the first area and the second area of the first substrate and exposes the third area, the second substrate including a common electrode extending to a position opposed to the power supply pad, the common electrode including a main common electrode extending substantially parallel to the main pixel electrode on both sides of the main pixel electrode; a liquid crystal layer including liquid crystal molecules held between the first substrate and the second substrate; a transparent shield electrode opposed to an entirety of the first area on an outside of the second substrate; a first electrically conductive member extending from the third area of the first substrate to an outside of the second substrate and electrically connecting the charge elimination pad and the shield electrode; and a second electrically conductive member located between the first substrate and second substrate and electrically connecting the power supply pad and the common electrode.

According to another embodiment, a liquid crystal display device includes: a first substrate including a first area, a second area located around the first area, and a third area neighboring the second area, the first area including a gate line extending in a first direction, a source line extending in a second direction crossing the first direction, a switching element electrically connected to the gate line and the source line, a pixel electrode which includes a sub-pixel electrode extending in the first direction and a main pixel electrode extending in the second direction and is connected to the switching element, and a first common electrode including a first sub-common electrode opposed to the gate line and a first main common electrode opposed to the source line, the second area including a power supply pad which is electrically connected to the first common electrode, and the third area including a charge elimination pad, a first pad electrically connected to the charge elimination pad, a second pad neighboring the first pad at a first pad distance and electrically connected to the power supply pad, and a third pad neighboring the second pad at a second pad distance greater than the first pad distance; a second substrate which is opposed to the first area and the second area of the first substrate and exposes the third area, the second substrate including a second common electrode extending to a position opposed to the power supply pad, the second common electrode including a second main common electrode extending in the second direction on both sides of the main pixel electrode; a liquid crystal layer including liquid crystal molecules held between the first substrate and the second substrate; a transparent shield electrode opposed to an entirety of the first area on an outside of the second substrate; a first electrically conductive member extending from the third area of the first substrate to an outside of the second substrate and electrically connecting the charge elimination pad and the shield electrode; and a second electrically conductive member located between the first substrate and second substrate and electrically connecting the power supply pad and the second common electrode.

According to another embodiment, a liquid crystal display device includes: a first substrate including a first area, a second area located around the first area, and a third area neighboring the second area, the first area including a gate line extending in a first direction, a source line extending in a second direction crossing the first direction, a switching element electrically connected to the gate line and the source line, a pixel electrode connected to the switching element, and a first common electrode of a common potential, the second area including a power supply pad which is electrically connected to the first common electrode, and the third area including a charge elimination pad, a first pad electrically connected to the charge elimination pad, a second pad neighboring the first pad at a first pad distance and electrically connected to the power supply pad, and a third pad neighboring the second pad at a second pad distance greater than the first pad distance; a second substrate which is opposed to the first area and the second area of the first substrate and exposes the third area; a liquid crystal layer including liquid crystal molecules held between the first substrate and the second substrate; a transparent shield electrode opposed to an entirety of the first area on an outside of the second substrate; and a first electrically conductive member extending from the third area of the first substrate to an outside of the second substrate and electrically connecting the charge elimination pad and the shield electrode.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is, for example, rectangular, and is composed of a plurality of pixels PX which are arrayed in a matrix of m×n (m and n are positive integers).

The array substrate AR includes a rectangular first area A1 corresponding to the active area ACT, and a second area A2 and a third area A3 which are located outside the active area. The second area A2 is located around the first area A1, and the third area A3 neighbors the second area A2. The first area A1 and second area A2 are opposed to the counter-substrate CT. The third area A3 corresponds to an extension part which extends outward from an end portion CTE of the counter-substrate CT. In short, the third area 3A is not opposed to the counter-substrate CT and is exposed from the counter-substrate CT.

In addition, the array substrate AR is rectangular, and includes a first end portion E1, a second end portion E2, a third end portion E3 and a fourth end portion E4. The first end portion E1 and third end portion E3 extend along a first direction X, and the second end portion E2 and fourth end portion E4 extend along a second direction Y which crosses the first direction X. The first end portion E1 is included in the third area A3.

The array substrate AR includes, in the first area A1, an n-number of gate lines G (G1 to Gn), an n-number of storage capacitance lines C (C1 to Cn), and an m-number of source lines S (S1 to Sm). The gate lines G and storage capacitance lines C extend, for example, substantially linearly in the first direction X. The gate lines G and storage capacitance lines C neighbor at intervals along the second direction Y, and are alternately arranged in parallel. In this example, the first direction X and the second direction Y are perpendicular to each other. The source lines S cross the gate lines G and storage capacitance lines C. The source lines S extend substantially linearly along the second direction Y. It is not always necessary that each of the gate lines G, storage capacitance lines C and source lines S extend linearly, and a part thereof may be bent.

Each of the gate lines G is led out to the second area A2 and is connected to a gate driver GD. Each of the source lines S is led to the second area A2 and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ. The pixel electrode PE and the common electrode CE are formed of a light-transmissive, electrically conductive material such as indium tin oxide (ITO) or indium zinc oxide (IZO), but may be formed of a metallic material such as aluminum.

In the present embodiment, the liquid crystal display panel LPN may have such a structure that both the pixel electrode PE and common electrode CE are formed on the array substrate, for example, a structure corresponding to an IPS mode or an FFS mode, or may have such a structure that at least a part of the common electrode CE is formed on the counter-substrate CT while the pixel electrode PE is formed on the array substrate AR.

In the description below, the structure in which at least a part of the common electrode CE is formed on the counter-substrate CT is described by way of example. In this structure, liquid crystal molecules of the liquid crystal layer LQ are switched by mainly using an electric field which is produced between the pixel electrode PE and the common electrode CE. The electric field, which is produced between the pixel electrode PE and the common electrode CE, is an oblique electric field which is slightly inclined to an X-Y plane defined by the first direction X and second direction Y or to a substrate major surface (or a lateral electric field which is substantially parallel to the substrate major surface).

The array substrate AR further includes a power supply pad TA, a charge elimination pad TB which is spaced apart from the power supply pad TA, and a plurality of electrode pads T which are electrically connected to a signal source such as a flexible wiring board.

The power supply pad TA is disposed in the second area A2 of the array substrate AR. Specifically, the power supply pad TA is disposed at a position opposed to the counter-substrate CT. The power supply pad TA is electrically connected via an electrically conductive member (not shown) to the common electrode CE which is formed on the counter-substrate CT. In the example illustrated, the power supply pad TA is disposed on one side (the left side in the Figure) of the driving IC chip 2, that is, on the fourth end portion E4 side in the second area A2.

The charge elimination pad TB is disposed in the third area A3 of the array substrate AR. Specifically, the charge elimination pad TB is disposed at a position which is not opposed to the counter-substrate CT. The charge elimination pad TB is electrically connected to a shield electrode (to be described later) via an electrically conductive member (not shown). In the example illustrated, the charge elimination pad TB is disposed on the other side (the right side in the Figure) of the driving IC chip 2, that is, on the second end portion E2 side in the third area A3.

The plural electrode pads T are disposed in the third area A3 of the array substrate AR. Specifically, the plural electrode pads T are disposed at a position which is not opposed to the counter-substrate CT. The plural electrode pads T are disposed at the first end portion E1 and are arranged along the first direction X. Of the plural electrode pads T, for example, an electrode pad T1 is electrically connected to the charge elimination pad TB, and an electrode pad T2 is electrically connected to the power supply pad TA. In addition, an electrode pad T22 is also electrically connected to the power supply pad TA.

In the example illustrated, the electrode pad T1 and electrode pad T2 are disposed on the second end portion E2 side (the right side in the Figure), and the electrode pad T22 is disposed on the fourth end portion E4 side (the left side in the Figure). The electrode pad T1 is connected to a connection wiring line W1 which extends from the charge elimination pad TB in the third area A3. The electrode pad T1 is set at, e.g. a ground potential (GND). By this structure, the shield electrode is de-electrified via the charge elimination pad TB.

A connection wiring line W2, which connects the electrode pad T2 and power supply pad TA, extends from the electrode pad T2 in the third area A3 to the second area A2, and then extends substantially linearly along the second end portion E2 in the second area A2. The connection wiring line W2 further extends substantially linearly along the third end portion E3 in the second area A2, extends substantially linearly along the fourth end portion E4 in the second area A2, and is connected to the power supply pad TA. A part of the connection wiring line W2 passes by the charge elimination pad TB, and is disposed adjacent to the connection wiring line W1. In other words, almost the entirety of the charge elimination pad TB and connection wiring line W1 is disposed in the vicinity of a part of the connection wiring line W2. The electrode pad T22 is connected to a connection wiring line W22 which extends from the power supply pad TA in the third area A3. The electrode pad T2 and electrode pad T22 are set at a common potential. By this structure, the common potential is supplied to the common electrode CE.

Figure 2:
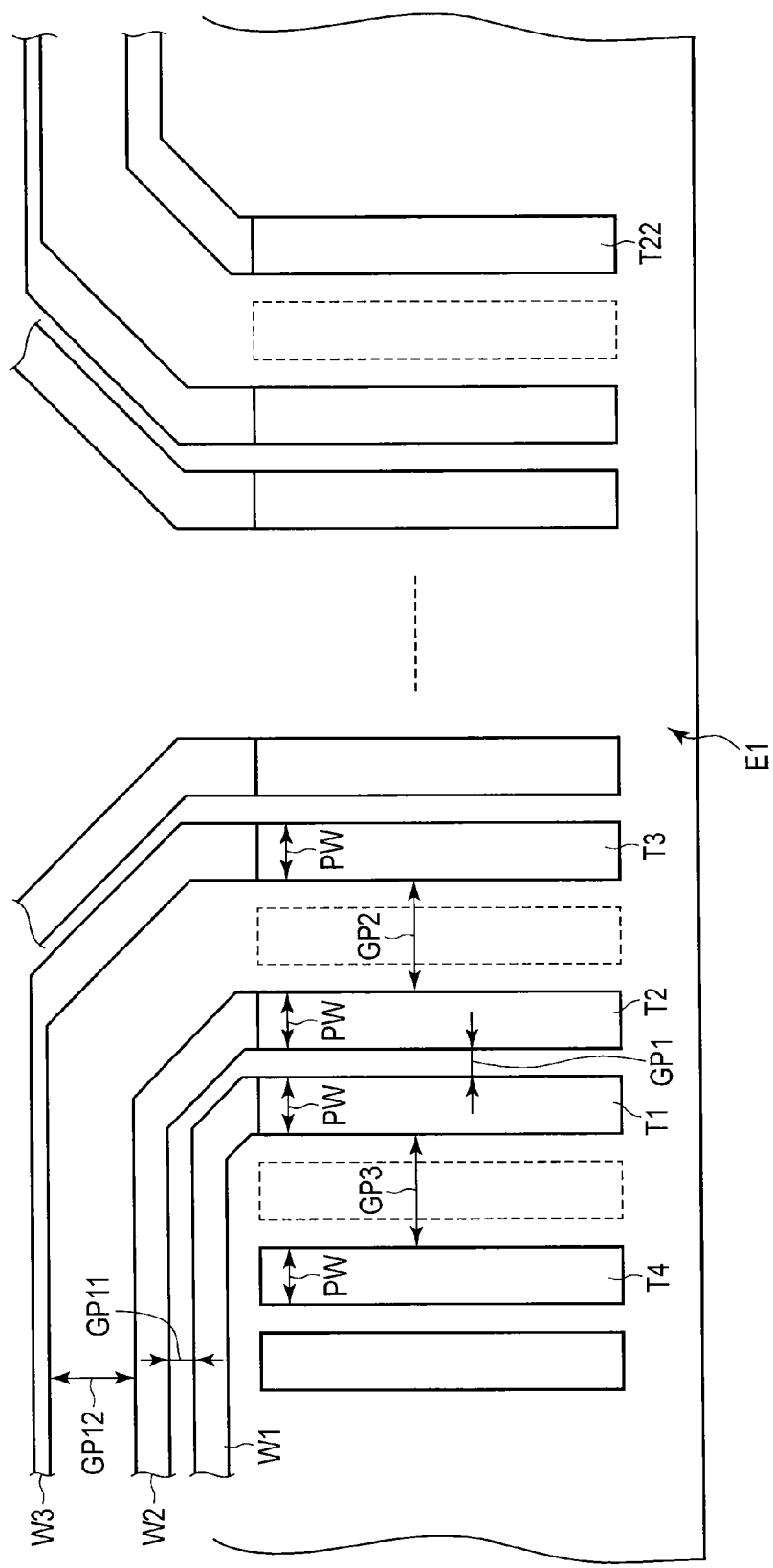
FIG. 2 is a plan view which illustrates, in enlarged scale, an area including an electrode pad T1 and an electrode pad T2 shown in FIG. 1.

FIG. 2 is a plan view which illustrates, in enlarged scale, an area including the electrode pad T1 and electrode pad T2 shown in FIG. 1.

Specifically, an electrode pad T4, the electrode pad T1, the electrode pad T2 and an electrode pad T3 are arranged in the named order and are disposed at the first end portion E1. The electrode pad T2 neighbors the electrode pad T1 at a first pad distance GP1. The electrode pad T3 neighbors the electrode pad T2 at a second pad distance GP2 which is greater than the first pad distance GP1. Specifically, the electrode pad T2, which is positioned between the electrode pad T1 and electrode pad T3, is disposed with such a bias as to closer to the electrode pad T1 than to the electrode pad T3. The electrode pad T3 is connected to, for example, a circuit for controlling a voltage which is applied to a source line or a gate line within the active area. The electrode pad T4 is disposed such that the electrode pad T1 is interposed between the electrode pad T4 and the electrode pad T2. The electrode pad T4 neighbors the electrode pad T1 at a third pad distance GP3 which is greater than the first pad distance GP1. Specifically, the electrode pad T1, which is positioned between the electrode pad T2 and electrode pad T4, is disposed with such a bias as to closer to the electrode pad T2 than to the electrode pad T4. The electrode pad T4 is, for example, a dummy pattern in an electrically floating state.

The electrode pads T1 to T4 have a substantially equal pad width PW. The first pad distance GP1 is less than the pad width PW of one electrode pad. On the other hand, the second pad distance GP2 is equal to or greater than the pad width PW of one electrode pad. Similarly, the third pad distance GP3 is equal to or greater than the pad width PW of one electrode pad. In the example illustrated, the second pad distance GP2 is equal to the third pad distance GP3. For example, the first pad distance GP1 is about 40 μm to 50 μm, and each of the second pad distance GP2 and third pad distance GP3 is about 180 μm to 200 μm. In this manner, on both sides of the electrode pad T1 and electrode pad T2 which are disposed close to each other, other electrode pads are disposed with intervals of a distance corresponding to one electrode pad or more.

The connection wiring line W2 neighbors the connection wiring line W1 at a first wiring distance GP11. A connection wiring line W3, which is connected to the electrode pad T3, neighbors the connection wiring line W2 at a second wiring distance GP12 which is greater than the first wiring distance GP11. Specifically, the second connection wiring line W2, which is positioned between the first connection wiring line W1 and third connection wiring line W3, is disposed with such a bias as to be closer to the first connection wiring line W1 than to the third connection wiring line W3.

As regards the electrode pad T22, too, the distance between the electrode pad T22 and a neighboring electrode pad is set to be equal to or greater than the pad width of one electrode pad. The distance between the connection wiring line W22, which is connected to the electrode pad T22, and a neighboring connection wiring line, is also set to be greater than the wiring distance between other connection wiring lines.

According to this structure, almost the entirety of the charge elimination pad TB and connection wiring line W1 is disposed near the connection wiring line W2, and the electrode pad T1 is disposed near the electrode pad T2. Thus, in the process of fabrication of the array substrate AR, even if static electrically has entered the charge elimination pad TB, the discharge to the connection wiring line W2 or electrode pad T2 can be induced at a point along the path reaching the electrode pad T1 via the connection wiring line W1. By the discharge from the charge elimination pad TB or connection wiring line W1 to the connection wiring line W2 or by the discharge from the electrode pad T1 to the electrode pad T2, the energy of static electricity, which has entered, can be consumed, and undesired electrification can be suppressed.

In addition, even if static electricity has entered the charge elimination pad TB, it is possible to suppress discharge to wiring lines or pads, other than the connection wiring line W2 and electrode pad T2. Further, it is possible to suppress secondary discharge from the electrode pad T2 to the electrode pad T3, after the discharge from the electrode pad T1 to the electrode pad T2, or to suppress secondary discharge from the connection wiring line W2 to the connection wiring line W3, after the discharge from the connection wiring line W1 to the connection wiring line W2. Therefore, it is possible to prevent breakage, due to electrostatic discharge, of the circuit which is connected to the electrode pad T3 and the connection wiring line W3. Specifically, since the entrance of static electricity to the active area, which is located inside the connection wiring line W2, can be suppressed and the discharge to the signal wiring or circuit for supplying signals to the active area can be suppressed, damage to the signal wiring or circuit due to discharge can be suppressed.

Besides, even if static electricity has entered the power supply pad TA, the same advantageous effects can be obtained. Specifically, a part of the connection wiring line W2, which is connected to the power supply pad TA, is disposed near the connection wiring line W1 and charge elimination pad TB, and the electrode pad T1 is disposed near the electrode pad T2. Thus, in the process of fabrication of the array substrate AR, even if static electrically has entered the power supply pad TA, the discharge to the charge elimination pad TB, connection wiring line W1 or electrode pad T1 can be induced at a point along the path reaching the electrode pad T2 via the connection wiring line W2. By the discharge from the connection wiring line W2 to the charge elimination pad TB or connection wiring line W1 or by the discharge from the electrode pad T2 to the electrode pad T1, the energy of static electricity, which has entered, can be consumed, and undesired electrification can be suppressed. In addition, even if static electricity has entered the power supply pad TA, it is possible to suppress discharge to wiring lines or pads, other than the charge elimination pad TB, the connection wiring line W1 and electrode pad T1.

The above-described example is directed to the case in which the charge elimination pad TB is connected to the electrode pad T1, and the power supply pad TA is connected to the electrode pad T2. Alternatively, the charge elimination pad TB may be connected to the electrode pad T2, and the power supply pad TA may be connected to the electrode pad T1.

FIG. 3 is a plan view which schematically shows a structure example of a pixel at a time when the liquid crystal display panel LPN shown in FIG. 1 is viewed from the counter-substrate side. FIG. 3 is a plan view in an X-Y plane.

The pixel PX, which is illustrated, has a rectangular shape having a less length in the first direction X than in the second direction Y, as indicated by a broken line. A gate line G1, a gate line G2 and a storage capacitance line C1 extend in the first direction X. The storage capacitance line C1 is disposed between the gate line G1 and gate line G2. A source line S1 and a source line S2 extend in the second direction Y. The pixel electrode PE is disposed between the source line S1 and source line S2 which neighbor each other. In addition, the pixel electrode PE is located between the gate line G1 and gate line G2.

In the example illustrated, the source line S1 is disposed at a left side end portion of the pixel, or in other words, the source line S1 is disposed to extend over a boundary between the pixel PX and a pixel neighboring on the left side. The source line S2 is disposed at a right side end portion of the pixel, or in other words, the source line S2 is disposed to extend over a boundary between the pixel PX and a pixel neighboring on the right side. The gate line G1 is disposed at an upper side end portion of the pixel, or in other words, the gate line G1 is disposed to extend over a boundary between the pixel PX and a pixel neighboring on the upper side. The gate line G2 is disposed at a lower side end portion of the pixel, or in other words, the gate line G2 is disposed to extend over a boundary between the pixel PX and a pixel neighboring on the lower side. The storage capacitance line C1 is disposed at a substantially central part of the pixel.

The pixel electrode PE includes a main pixel electrode PA and a sub-pixel electrode PB. The main pixel electrode PA and sub-pixel electrode PB are formed to be integral or continuous, and are electrically connected to each other. The main pixel electrode PA is located between the source line S1 and source line S2, and linearly extends in the second direction Y from the vicinity of the upper side end portion of the pixel PX and to the vicinity of the lower side end portion of the pixel PX. The main pixel electrode PA is formed in a strip shape having a substantially equal width in the first direction X. The sub-pixel electrode PB linearly extends in the first direction X from the vicinity of the left side end portion of the pixel PX and to the vicinity of the right side end portion of the pixel PX. The sub-pixel electrode PB is located above the storage capacitance line C1, and is electrically connected to the switching element. The pixel electrode PE, which is illustrated, is formed in a cross shape.

The common electrode CE includes main common electrodes CA. The main common electrodes CA extend, in the X-Y plane, linearly in the second direction Y that is substantially parallel to the direction of extension of the main pixel electrode PA, on both sides of the main pixel electrode PA. Alternatively, the main common electrodes CA are opposed to the source lines S, and extend substantially in parallel to the direction of extension of the main pixel electrode PA. The main common electrode CA is formed in a strip shape having a substantially equal width in the first direction X. The main common electrodes CA are electrically connected to each other within the active area or outside the active area.

Paying attention to the positional relationship between the main pixel electrode PA and the main common electrodes CA, the main pixel electrode PA and the main common electrodes CA are alternately arranged along the first direction X. The main pixel electrode PA and the main common electrodes CA are disposed substantially parallel to each other. In this case, in the X-Y plane, neither of the main common electrodes CA overlaps the main pixel electrode PA. Transmissive regions, through which light can pass, are formed between the pixel electrode PE and the main common electrodes CA.

Figure 4:
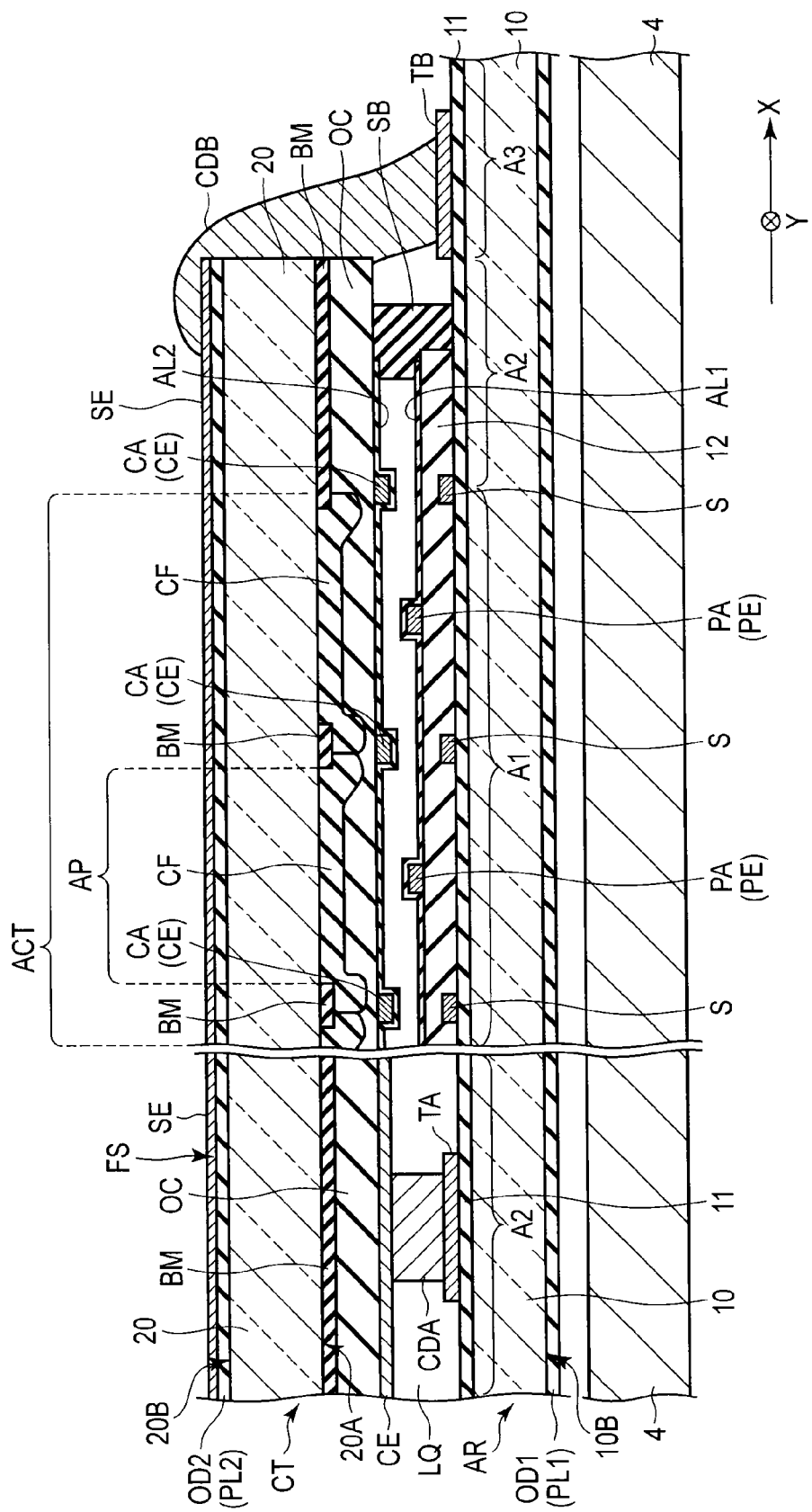
FIG. 4 is a cross-sectional view of the liquid crystal display panel shown in FIG. 3, taken along line A-A, illustrating a cross-sectional structure of the pixel, a cross-sectional structure of a power supply pad and a cross-sectional structure of a charge elimination pad.

FIG. 4 is a cross-sectional view of the liquid crystal display panel LPN shown in FIG. 3, taken along line A-A, illustrating a cross-sectional structure of the pixel, a cross-sectional structure of the power supply pad TA and a cross-sectional structure of the charge elimination pad TB. FIG. 4 shows only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. The array substrate AR includes, in the first area A1 corresponding to the active area ACT, the source lines S, pixel electrode PE including the main pixel electrode PA, a first insulation film 11, a second insulation film 12, and a first alignment film AL1. The source lines S are formed on the first insulation film 11 and are covered with the second insulation film 12. The gate lines and storage capacitance lines, which are not shown, are disposed, for example, between the first insulative substrate 10 and the first insulation film 11. The pixel electrode PE is formed on the second insulation film 12. The pixel electrode PE is located on the inside of positions immediately above the neighboring source lines S. The first alignment film AL1 is disposed on that surface of the array substrate AR, which is opposed to the counter-substrate CT, and the first alignment film AL1 extends over substantially the entirety of the first area A1. The first alignment film AL1 covers the pixel electrode PE, etc., and is also disposed over the second insulation film 12. The first alignment film AL1 is formed of a material which exhibits horizontal alignment properties.

The array substrate AR also includes a power supply pad TA in the second area A2 and a charge elimination pad TB in the third area A3. The power supply pad TA and charge elimination pad TB are located, for example, on the outside of a sealant SB, formed on the first insulation film 11, and exposed from the second insulation film 12 and first alignment film AL1. The power supply pad TA and charge elimination pad TB are formed by using the same material as the source lines S and pixel electrode PE.

In the meantime, the array substrate AR may further include a part of the common electrode CE. A part of the common electrode CE, which is provided on the array substrate AR, extends on the outside of the active area ACT and is electrically connected to the power supply pad TA.

The counter-substrate CT is formed by using a second insulative substrate 20 having light transmissivity. The counter-substrate CT includes, on the inside of the second insulative substrate 20, that is, on the side thereof facing the array substrate AR, a black matrix BM, a color filter CF, an overcoat layer OC, the common electrode CE including the main common electrodes CA, and a second alignment film AL2.

The black matrix BM is disposed on an inner surface 20A of the second insulative substrate 20, which is opposed to the array substrate AR. The black matrix BM partitions the pixels PX and forms an aperture portion AP which is opposed to the pixel electrode PE. Specifically, the black matrix BM is disposed so as to be opposed to wiring portions, such as the source lines S, gate lines, storage capacitance lines, and switching elements. In this example, only the portions of the black matrix BM, which extend in the second direction Y, are illustrated, but the black matrix BM may include portions extending in the first direction X. In addition, the black material BM also extends to the outside of the active area ACT.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surfaces of the color filters CF. In addition, the overcoat layer OC extends to the outside of the active area ACT and is stacked on the black material BM. The overcoat layer OC is formed of, for example, a transparent resin material.

The common electrode CE is formed on that side of the overcoat layer OC, which is opposed to the array substrate AR. In the example illustrated, the main common electrodes CA are located below the black material BM and are located above the source lines S. In addition, the common electrodes CE extend to a position opposed to the power supply pad TA.

The second alignment film AL2 is disposed on that surface of the counter-substrate CT, which is opposed to the array substrate AR, and the second alignment film AL2 extends over substantially the entirety of the active area ACT. The second alignment film AL2 covers the common electrode CE and overcoat layer OC. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, is parallel to a second alignment treatment direction PD2, in which the second alignment film AL2 initially aligns the liquid crystal molecules. In an example shown in part (A) of FIG. 3, the first alignment treatment direction PD1 and second alignment treatment direction PD2 are parallel to the second direction Y and are identical. In an example shown in part (B) of FIG. 3, the first alignment treatment direction PD1 and second alignment treatment direction PD2 are parallel to the second direction Y and are opposite to each other.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by the sealant SB on the outside of the active area ACT in the state in which the predetermined cell gap is created therebetween.

The liquid crystal layer LQ is held in the cell gap which is created between the array substrate AR and the counter-substrate CT on the inside surrounded by the sealant SB, and is disposed between the first alignment film AL1 and second alignment film AL2. The liquid crystal layer LQ includes liquid crystal molecules LM. The liquid crystal layer LQ is composed of, for example, a liquid crystal material having a positive (positive-type) dielectric constant anisotropy.

A first optical element OD1 is attached by, e.g. an adhesive, to an outer surface of the array substrate AR, that is, an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1.

A second optical element OD2 is attached by, e.g. an adhesive, to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2.

The first polarization axis AX1 of the first polarizer PL1 and the second polarization axis AX2 of the second polarizer PL2 have a positional relationship of crossed Nicols. In this case, one of the polarizers is disposed such that the polarization axis thereof is parallel or perpendicular to the initial alignment direction of liquid crystal molecules. Specifically, when the initial alignment direction is parallel to the second direction Y, the polarization axis of one of the polarizers is parallel to the second direction Y or is parallel to the first direction X. In an example shown in part (a) of FIG. 3, the first polarizer PL1 is disposed such that the first polarization axis AX1 thereof is perpendicular to the second direction Y, and the second polarizer PL2 is disposed such that the second polarization axis AX2 thereof is parallel to the second direction Y. In an example shown in part (b) of FIG. 3, the second polarizer PL2 is disposed such that the second polarization axis AX2 thereof is perpendicular to the second direction Y, and the first polarizer PL1 is disposed such that the first polarization axis AX1 thereof is parallel to the second direction Y.

The shield electrode SE is disposed on the outside of the counter-substrate CT. The shield electrode SE is opposed to the entirety of the first area A1. Specifically, the shield electrode SE is disposed over the entirety of the active area ACT. In the example illustrated, the shield electrode SE is formed over the entirety of a surface FS of the second optical element OD2, and is opposed to not only the first area A1 but also the second area A2 and third area A3. In other words, the shield electrode SE extends not only over the active area ACT, but also on the outside of the active area ACT. The shield electrode SE is formed of a substantially transparent, electrically conductive material such as ITO or IZO. The shield electrode SE suppresses the entrance of an undesired electric field from the outside to the liquid crystal layer LQ. Thus, in such a structure that the above-described strip-shaped main common electrodes CA are disposed on the display surface side, e.g. the counter-substrate CT side, or in a structure corresponding to an IPS mode or an FFS mode, in which common electrodes are not formed on the counter-substrate CT, it is desirable that the shield electrode SE be disposed. By disposing the shield electrode SE, it is possible to suppress the occurrence of a defect on display, such as disturbance of alignment of liquid crystal molecules, due to the entrance of an undesired electric field.

In the meantime, the shield electrode SE may be disposed on the outer surface 20B or inner surface 20A of the second insulative substrate 20.

An electrically conductive member CDA is disposed between the array substrate AR and the counter-substrate CT. The power supply pad TA on the array substrate AR side and the common electrode CE on the counter-substrate CT side are electrically connected by the conductive member CDA. An electrically conductive member CDB extends from the third area A3 of the array substrate AR to the outside of the counter-substrate CT. The charge elimination pad TB on the array substrate AR side and the shield electrode SE on the counter-substrate CT side are electrically connected by the conductive member CDB. The conductive member CDA and conductive member CDB are formed of, for example, an electrically conductive paste containing electrically conductive particles of silver, carbon, etc.

Next, the operation of the liquid crystal display panel LPN having the above-described structure is described with reference to FIG. 3 and FIG. 4.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 3. Specifically, the initial alignment direction of the liquid crystal molecule LM is parallel to the second direction Y.

When the first alignment treatment direction PD1 and second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, is linear polarization perpendicular to the first polarization axis AX1 of the first polarizer PL1. The polarization state of such linear polarization hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a potential difference is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is substantially parallel to the X-Y plane, as indicated by solid lines in the Figure.

In the example shown in FIG. 3, the liquid crystal molecule LM in a lower half part of the region between the pixel electrode PE and left-side main common electrode CA rotates clockwise relative to the second direction Y, and is aligned in a lower left direction in the Figure. The liquid crystal molecule LM in an upper half part of the region between the pixel electrode PE and left-side main common electrode CA rotates counterclockwise relative to the second direction Y, and is aligned in an upper left direction in the Figure. The liquid crystal molecule LM in a lower half part of the region between the pixel electrode PE and right-side main common electrode CA rotates counterclockwise relative to the second direction Y, and is aligned in a lower right direction in the Figure. The liquid crystal molecule LM in an upper half part of the region between the pixel electrode PE and right-side main common electrode CA rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains is formed in one pixel PX.

At such ON time, part of backlight, which is incident on the liquid crystal display panel LPN from the backlight 4, passes through the first polarizer PL1, and enters the liquid crystal display panel LPN. The light entering the liquid crystal display panel LPN is linearly polarized light which is perpendicular to the first polarization axis AX1 of the first polarizer PL1. The polarization state of such linearly polarized light varies depending on the alignment state of the liquid crystal molecules LM when the light passes through the liquid crystal layer LQ. Thus, at least part of the light emerging from the liquid crystal layer LQ passes through the second polarizer PL2 (white display).

According to the present embodiment, the shield electrode SE is disposed on the outside of the counter-substrate CT. Thus, even if the counter-substrate CT is electrified or an external electric field tries to enter the liquid crystal layer LQ from the display surface side, charge is dispersed by the shield electrode SE, and the charge can be let to escape to the electrode pad T1 of the ground potential via the conductive member CDB and charge elimination pad TB. Thus, the liquid crystal layer LQ is hardly affected by an undesired electric field, and a desired electric field, which is produced between the pixel electrode PE and common electrode CE, can be applied to the liquid crystal layer LQ. In particular, in a region where the common electrode CE is not formed, that is, in a region where the aperture portion AP is formed, it becomes possible to suppress an alignment defect of liquid crystal molecules due to a behavior of liquid crystal molecules by an undesired electric field produced by the effect of electrification. Thereby, degradation in display quality can be suppressed.

In addition, the charge, which was let to escape to the charge elimination pad TB, connection wiring line W1 or electrode pad T1, tends to be discharged to the nearby connection wiring line W2 or electrode pad T2. Thus, the accumulation of the charge along the path, through which the charge is dispersed, can be suppressed.

According to the present embodiment, a high transmittance can be obtained in the inter-electrode gap between the pixel electrode and the common electrode. Thus, a transmittance per pixel can sufficiently be increased by increasing the inter-electrode distance between the main pixel electrode and the main common electrode. As regards product specifications in which the pixel pitch is different, the peak condition of the transmittance distribution can be used by varying the inter-electrode distance between the main pixel electrode and the main common electrode. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

In addition, according to the present embodiment, in the region overlapping the black matrix BM, the transmittance is sufficiently lowered. The reason for this is that the electric field does not leak to the outside of the pixel from the position of the common electrode CE that is located above the source line, and an undesired lateral electric field does not occur between pixels which neighbor each other with the black matrix BM interposed, and therefore the liquid crystal molecules in the region overlapping the black matrix BM keep the initial alignment state, like the case of the OFF time (or black display time). Accordingly, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the horizontal inter-electrode distance between the pixel electrode and the common electrodes on both sides of the pixel electrode. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters differ between neighboring pixels, the occurrence of color mixture can be suppressed, and the decrease in color reproducibility or the decrease in contrast ratio can be suppressed.

According to the present embodiment, a plurality of domains can be formed in one pixel. Thus, the viewing angle can optically be compensated in plural directions, and a wide viewing angle can be realized.

Over the pixel electrode PE or over the common electrode CE, since a lateral electric field is hardly produced (or an electric field enough to drive liquid crystal molecules LM is not produced) even at the ON time, as well as the OFF time, the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the pixel electrode PE and the common electrode CE do not necessarily need to be formed of a transparent, electrically conductive material, and may be formed of an opaque, electrically conductive material.

In the present embodiment, the structure of the pixel PX is not limited to the example shown in FIG. 3.

FIG. 5 is a plan view which schematically shows another structure example of the pixel PX at a time when the array substrate AR shown in FIG. 1 is viewed from the counter-substrate side.

This structure example corresponding to a structure in which the array substrate AR includes a pixel electrode PE and a common electrode CE1. The structure of the pixel electrode PE including the main pixel electrode PA and sub-pixel electrode PB is the same as the structure example shown in FIG. 3, and the pixel electrode PE is disposed at a substantially central part of the pixel PX. The common electrode CE1 is formed in a grid shape in a manner to surround the pixel electrode PE.

Specifically, the common electrode CE1 includes main common electrodes CA1 and sub-common electrodes CB1, and is covered with the first alignment film AL1 The main common electrodes CA1 and the sub-common electrodes CB1 are formed to be integral or continuous, and are electrically connected to each other. The main common electrodes CA1 linearly extend in the second direction Y that is substantially parallel to the direction of extension of the main pixel electrode PA, on both sides of the main pixel electrode PA. The main common electrodes CA1 are opposed to the source line S1 and source line S2. The sub-common electrodes CB1 extend in the first direction X. The sub-common electrodes CB1 are opposed to the gate line G1 and gate line G2. The common electrode CE1 with this structure extends from the first area A1 to the second area A2, and is electrically connected to the power supply pad TA.

The array substrate AR with this structure may be combined with the counter-substrate CT shown in FIG. 3 and FIG. 4, thereby constituting a liquid crystal display panel. In this case, the main common electrodes CA of the counter-substrate CT are opposed to the main common electrodes CA1 of the array substrate AR. The common electrode CE1 of the array substrate AR and the common electrode CE of the counter-substrate CT are electrically connected, and have the same potential In this structure example, too, it is desirable to dispose the shield electrode SE on the counter-substrate CT, and the charge elimination pad TA, first connection wiring line W1 and electrode pad T1 for grounding the shield electrode SE are necessary. In addition, the power supply pad TB, second connection wiring line W2 and electrode pad T2 for supplying a common potential to the common electrodes are necessary. In this case, the layout from the charge elimination pad TB to the electrode pad T1 and the layout from the power supply pad TA to the electrode pad T2 may be made similar to the above-described example, and thereby the same advantageous effects can be obtained.

In addition, in this structure example, with the provision of the main common electrodes CA1, an undesired electric field from the source lines S can be shielded. Moreover, with the provision of the sub-common electrodes CB1, an undesired electric field from the gate lines G can be shielded. Thereby, degradation in display quality can be suppressed.

The structure of the array substrate AR, according to the structure example shown in FIG. 5, is common to the structure of the IPS mode or FFS mode, in that the array substrate AR includes the pixel electrode PE and common electrode CE. In the IPS mode or FFS mode, as described above, since no common electrode is disposed on the counter-substrate side, it is desirable to dispose the shield electrode on the counter-substrate side that is the display surface side, and it is necessary to provide the charge elimination pad TA, first connection wiring line W1 and electrode pad T1 for grounding the shield electrode. Furthermore, the power supply pad TB, second connection wiring line W2 and electrode pad T2 for supplying a common potential to the common electrodes, which are provided on the array substrate, are necessary. In this case, the layout from the charge elimination pad TB to the electrode pad T1 and the layout from the power supply pad TA to the electrode pad T2 may be made similar to the above-described example, and thereby the same advantageous effects can be obtained.

In the present embodiment, the structure of the pixel PX is not limited to the examples shown in FIG. 3 and FIG. 5.

The above-described examples relate to the structure in which the storage capacitance line is disposed immediately below the sub-pixel electrode PB. However, the gate line may be disposed immediately below the sub-pixel electrode PB. In addition, the position of disposition of the storage capacitance line may not be a substantially central part of the pixel, and the position of disposition of the gate line may not be the upper side end portion or lower side end portion of the pixel. Besides, the above-described examples relate to the case in which the pixel electrode PE includes the main pixel electrode PA and sub-pixel electrode PB. However, the pixel electrode PE may not include the sub-pixel electrode PB, if the pixel electrode PE can be electrically connected to the switching element SW. The above-described examples relate to the case in which the direction of extension of the main pixel electrode PA is the second direction Y. However, the main pixel electrode PA may extend in the first direction X. In this case, the direction of extension of the main common electrode CA is the first direction X. In addition, the above-described examples relate to the case in which in relation to the pixel electrode PE including the main pixel electrode PA, there is provided the common electrode CE including the main common electrodes CA located on both sides of the main pixel electrode PA. Alternatively, in relation to the common electrode CE including the main common electrode CA, there may be provided the pixel electrode PE including the main pixel electrodes PA located on both sides of the main common electrode CA. The above-described examples relate to the case in which the common electrode CE includes the main common electrodes CA on the counter-substrate, but the embodiment is not limited to the examples. For example, the common electrode CE may include, in addition to the above-described main common electrodes CA, sub-common electrodes which are provided on the counter-substrate CT and are opposed to the gate lines G and storage capacitance line C. The sub-common electrodes extend in the first direction X and are formed integral or continuous with the main common electrodes CA.

As has been described above, according to the present embodiment, there can be provided a liquid crystal display device which can improve the manufacturing yield.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first area, a second area located around the first area, and a third area neighboring the second area, the first area including a pixel electrode including a strip-shaped main pixel electrode, the second area including a power supply pad, and the third area including a charge elimination pad, a first pad electrically connected to the charge elimination pad, a second pad neighboring the first pad at a first pad distance and electrically connected to the power supply pad, and a third pad neighboring the second pad at a second pad distance greater than the first pad distance;
a second substrate which is opposed to the first area and the second area of the first substrate and exposes the third area, the second substrate including a common electrode extending to a position opposed to the power supply pad, the common electrode including a main common electrode extending substantially parallel to the main pixel electrode on both sides of the main pixel electrode;
a liquid crystal layer including liquid crystal molecules held between the first substrate and the second substrate;
a transparent shield electrode opposed to an entirety of the first area on an outside of the second substrate;
a first electrically conductive member extending from the third area of the first substrate to the outside of the second substrate and electrically connecting the charge elimination pad and the shield electrode; and
a second electrically conductive member located between the first substrate and second substrate and electrically connecting the power supply pad and the common electrode,
wherein the first substrate further includes a first connection wiring line which connects the first pad and the charge elimination pad, a second connection wiring line which neighbors the first connection wiring line at first wiring distance and connects the second pad and the power supply pad, and a third connection wiring line which neighbors the second connection wiring line at a second wiring distance greater than the first wiring distance and is connected to the third pad.

2. The liquid crystal display device of claim 1, wherein the third area further includes a fourth pad neighboring the first pad at a third pad distance greater than the first pad distance.

3. The liquid crystal display device of claim 2, wherein the first substrate has a rectangular shape with a first end portion, a second end portion, a third end portion and a fourth end portion, and
the first pad, the second pad, the third pad and fourth pad are disposed at the first end portion.

4. The liquid crystal display device of claim 3, wherein the first pad, the second pad, the third pad and fourth pad have a substantially equal pad width, and
each of the second pad distance and the third pad distance is equal to or greater than the pad width.

5. The liquid crystal display device of claim 3, wherein the second connection wiring line extends from the second pad to the second area, further extends along the second end portion, the third end portion and the fourth end portion in the second area, and is connected to the power supply pad.

6. The liquid crystal display device of claim 1, further comprising a first optical element which is disposed on an outer surface of the first substrate and includes a first polarizer, and a second optical element which is disposed on an outer surface of the second substrate and includes a second polarizer,
wherein the shield electrode is formed on a surface of the second optical element.

7. The liquid crystal display device of claim 6, wherein the first polarizer includes a first polarization axis, and the second polarizer includes a second polarization axis which is in a positional relationship of crossed Nicols in relation to the first polarization axis, and
in a state in which no electric field is produced between the pixel electrode and the common electrode, an initial alignment direction of the liquid crystal molecules is substantially parallel to a direction of extension of the main pixel electrode, and is perpendicular or parallel to the first polarization axis.

8. A liquid crystal display device comprising:
a first substrate including a first area, a second area located around the first area, and a third area neighboring the second area, the first area including a gate line extending in a first direction, a source line extending in a second direction crossing the first direction, a switching element electrically connected to the gate line and the source line, a pixel electrode which includes a sub-pixel electrode extending in the first direction and a main pixel electrode extending in the second direction and is connected to the switching element, and a first common electrode including a first sub-common electrode opposed to the gate line and a first main common electrode opposed to the source line, the second area including a power supply pad which is electrically connected to the first common electrode, and the third area including a charge elimination pad, a first pad electrically connected to the charge elimination pad, a second pad neighboring the first pad at a first pad distance and electrically connected to the power supply pad, and a third pad neighboring the second pad at a second pad distance greater than the first pad distance;
a second substrate which is opposed to the first area and the second area of the first substrate and exposes the third area, the second substrate including a second common electrode extending to a position opposed to the power supply pad, the second common electrode including a second main common electrode extending in the second direction on both sides of the main pixel electrode;
a liquid crystal layer including liquid crystal molecules held between the first substrate and the second substrate;
a transparent shield electrode opposed to an entirety of the first area on an outside of the second substrate;
a first electrically conductive member extending from the third area of the first substrate to the outside of the second substrate and electrically connecting the charge elimination pad and the shield electrode; and
a second electrically conductive member located between the first substrate and second substrate and electrically connecting the power supply pad and the second common electrode,
wherein the first substrate further includes a first connection wiring line which connects the first pad and the charge elimination pad, a second connection wiring line which neighbors the first connection wiring line at first wiring distance and connects the second pad and the power supply pad, and a third connection wiring line which neighbors the second connection wiring line at a second wiring distance greater than the first wiring distance and is connected to the third pad.

9. The liquid crystal display device of claim 8, wherein the third area further includes a fourth pad neighboring the first pad at a third pad distance greater than the first pad distance.

10. The liquid crystal display device of claim 9, wherein the first substrate has a rectangular shape with a first end portion a second end portion, a third end portion and a fourth end portion, and
the first pad, the second pad, the third pad and fourth pad are disposed at the first end portion.

11. The liquid crystal display device of claim 10, wherein the first pad, the second pad, the third pad and fourth pad have a substantially equal pad width, and
each of the second pad distance and the third pad distance is equal to or greater than the pad width.

12. The liquid crystal display device of claim 10, wherein the second connection wiring line extends from the second pad to the second area, further extends along the second end portion, the third end portion and the fourth end portion in the second area, and is connected to the power supply pad.

13. The liquid crystal display device of claim 8, further comprising a first optical element which is disposed on an outer surface of the first substrate and includes a first polarizer, and a second optical element which is disposed on an outer surface of the second substrate and includes a second polarizer,
wherein the shield electrode is formed on a surface of the second optical element.

14. The liquid crystal display device of claim 13, wherein the first polarizer includes a first polarization axis, and the second polarizer includes a second polarization axis which is in a positional relationship of crossed Nicols in relation to the first polarization axis, and
in a state in which no electric field is produced between the pixel electrode and the first and second common electrodes, an initial alignment direction of the liquid crystal molecules is substantially parallel to a direction of extension of the main pixel electrode, and is perpendicular or parallel to the first polarization axis.

15. A liquid crystal display device comprising:
a first substrate including a first area, a second area located around the first area, and a third area neighboring the second area, the first area including a pixel electrode, the second area including a first connection pad, and the third area including a second connection pad, a first pad electrically connected to the second connection pad, a second pad neighboring the first pad at a first pad distance and electrically connected to the first connection pad, and a third pad neighboring the second pad at a second pad distance greater than the first pad distance;
a second substrate which is opposed to the first area and the second area of the first substrate and exposes the third area the second substrate including a common electrode opposed to the first substrate;
a liquid crystal layer including liquid crystal molecules held between the first substrate and the second substrate;
a conductive electrode located on an outside of the second substrate;
a first electrically conductive member extending from the third area of the first substrate to the outside of the second substrate and electrically connecting the second connection pad and the conductive electrode; and
a second electrically conductive member located between the first substrate and the second substrate and electrically connecting the first connection pad and the common electrode,
wherein the first substrate has a rectangular shape with a first end portion, a second end portion, a third end portion, and a fourth end portion, and the first pad, the second pad, and the third pad are disposed at the first end portion,
the first substrate further includes a first connection wiring line which connects the first pad and the second connection pad, a second connection wiring line which neighbors the first connection wiring line and connects the second pad and the first connection pad and a third connection wiring line which neighbors the second connection wiring line and is connected to the third pad, and
the second connection wiring line extends from the second pad to the second area, further extends along the second end portion, the third end portion, and the fourth end portion in the second area, and is connected to the first connection pad.

16. The liquid crystal display device of claim 15, wherein the common electrode includes a main common electrode extending in a second direction.

17. The liquid crystal display device of claim 15, wherein the conductive electrode is opposed to an entirety of the first area on an outside of the second substrate.

* * * * *